Patented Aug. 5, 1941

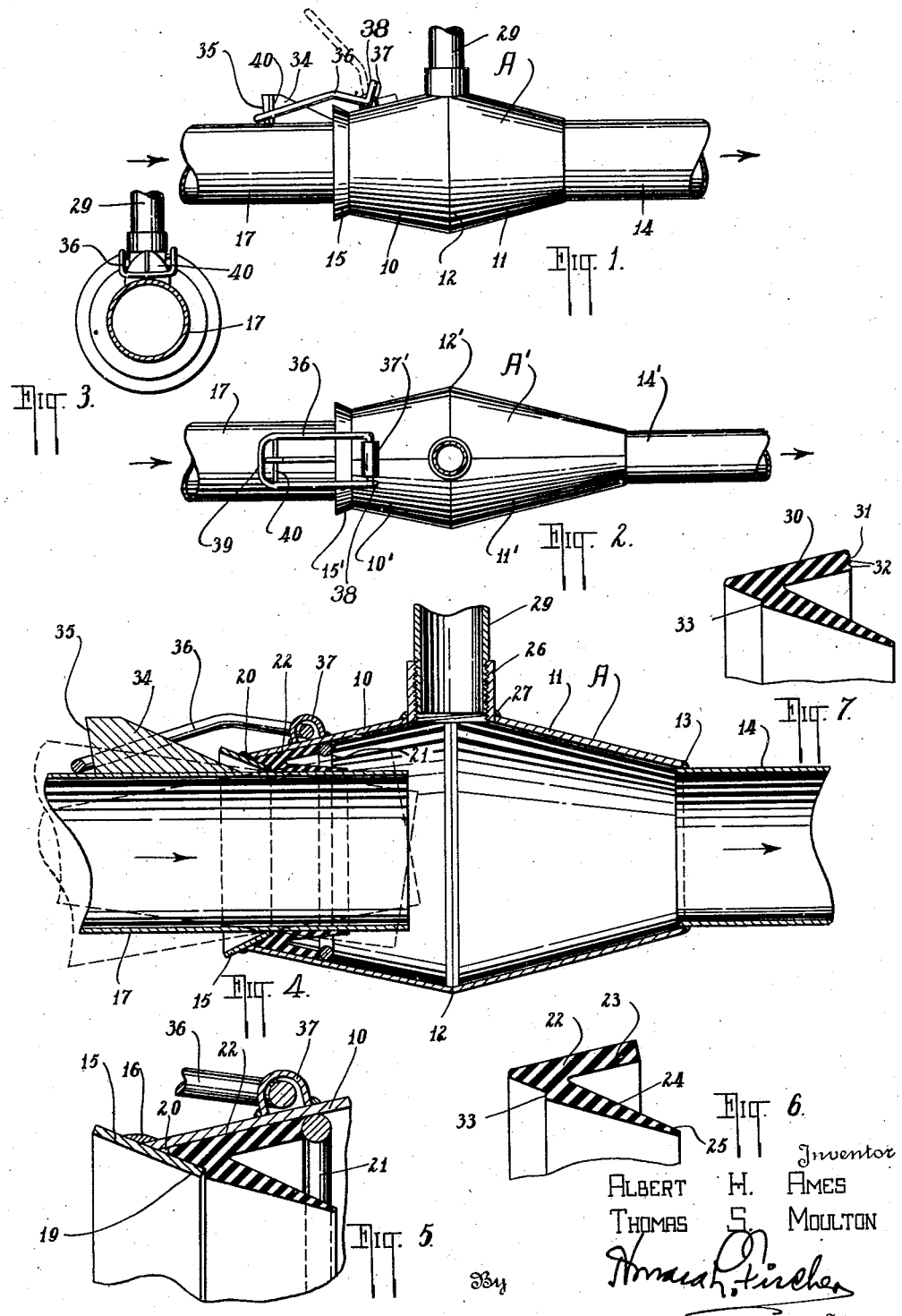

2,251,651

UNITED STATES PATENT OFFICE 2,251,651

COUPLER

Albert H. Ames, St. Paul, and Thomas S. Moulton, Withrow, Minn.

Application January 2, 1940, Serial No. 312,084

8 Claims. (Cl. 285—172)

Our invention relates to an improvement in couplers, wherein it is desired to provide a coupler capable of forming a flexible joint between a pair of tubular members.

In recent years irrigation of land has become increasingly popular. With this growth in popularity of irrigation, it has become necessary to provide a means of conducting water from a source of supply over fields of large area. It has therefore become necessary to provide couplers which not only can form a joint sufficiently flexible to permit the pipe to curve to some extent about obstructions, but also which may be easily and quickly assembled.

It is an object of the present invention to provide a coupler which may be connected and disconnected from another length of pipe in an extremely simple manner. With our construction, the coupler is preferably secured to one end of a length of pipe and is removably connected to the end of an adjacent section of pipe. Our coupler is so devised that it may be attached to or removed from an adjacent pipe section without the necessity of handling the coupler itself. Thus from substantially the center of the pipe being removed or attached, the coupler may be attached or removed from the adjacent section.

It is a purpose of our invention to provide an attaching means between a coupler and an adjacent pipe so constructed that when engaged the pipe and coupler are definitely secured against accidental disengagement. In preferred form, this construction includes a loop-shaped link engageable over a cam latch on the adjacent pipe section. In order to remove the link from the latch, we provide cam means so designed that by rotating the coupler with respect to the pipe, the link may be pivoted out of engagement with the latch and the coupler may be removed from its engagement with the adjacent pipe end.

It is a feature of our invention to provide a gasket substantially V-shaped in cross section so that the pressure of the liquid within the coupler will act to spread the sides of the gasket against the inner wall of the coupler and the pipe end. The V-shape of the gasket permits the water pressure to act as a wedge to maintain a tight seal between the coupler and the removable pipe.

It is a feature of our invention that the gasket is interposed between a ring-shaped tapered guide in the inlet of the coupler and a ring secured to the inner surface of the coupler. The gasket is formed of resilient material and is wedged at one end between the ring-shaped guide member and the wall of the coupling and at the other end is wedged between the ring and the wall of the coupling. Thus the gasket forms an extremely tight seal with the outer wall of the coupling which permits virtually no leakage about the outside of the gasket.

It is a feature of our invention to construct a coupler which may be formed of light material and which is extremely strong. Our coupler includes a pair of opposed substantially frustro-conical wall sections connected together at their larger diameter ends. One wall section is connected at its smaller diameter end to the end of a pipe or tube, while the other end of the coupler is provided with a frustro-conical guide ring which has its larger diameter end facing outwardly to receive the end of a pipe to which the coupler is to be attached. This ring is secured to the end of the side wall coupler member in such a manner as to project inwardly and outwardly from the wall and to serve several purposes. This ring obviously reinforces the end of the coupler to which it is welded or otherwise secured, acts as a guide for the pipe to be inserted, forms a guide which permits angularity of the attached pipe, and forms a groove for receiving an end of the V-shaped gasket. Thus our coupling may be formed of light material, and when constructed is so strong that an extreme compressive force may be exerted upon the same without deforming the coupling.

It is a further feature of our invention to provide a coupling with a loop or bail which engages a latch on an adjoining pipe and which is curved or arcuated from the point of pivot between the pipe and coupling. Thus regardless of the angularity between the coupling and the attached pipe, the latch will engage the bail in a similar manner.

It is a further feature of our invention to form a coupling of the same material as the pipe or tube to which the coupling is attached. This is an extremely important feature, as by this means the coupling may be more quickly and easily welded to the pipe. Previously, couplings have been formed of cast metal of various types, and in some instances have been formed of sheet material, but such couplings are not designed to be welded to pipes or tubes formed of similar metal. When the present coupling is formed of sheet metal of similar thickness to that of the pipe or tubing to which the coupling is welded, the heat of the welding torch or at the point of the weld heats both of the elements similarly and equally well. Obviously where a thick member such as a cast coupling is attached to a thin wall tube, the tube becomes heated more quickly than the coupling and often times burns the tubing or improperly welds the same. When both the coupling and the pipe are of the same material, the material on either side of the weld is heated equally and evenly and a more secure weld may be obtained in a quicker length of time.

These and other objects and novel features of our invention will be more clearly and fully set forth in the following specification and claims.

In the drawing forming a part of our specification:

Figure 1 is a side elevation view of the coupling and attached pipes.

Figure 2 is a top plan view of a reducer coupling similar but not identical to the coupling illustrated in Figure 1.

Figure 3 is an end view of the coupling shown in Figures 1 and 2.

Figure 4 is an enlarged sectional view centrally through the coupling showing the construction thereof.

Figure 5 is an enlarged detailed view of the end of the coupling containing the gasket showing the detail construction thereof.

Figure 6 is a cross-sectional view through the gasket illustrated in Figures 4 and 5.

Figure 7 is a sectional view similar to Figure 6, but showing a modified form of gasket construction.

The coupler A comprises a pair of frustro-conical sections 10 and 11 which are welded together at their larger ends 12 to form a body which is of greater diameter at the center than at the ends. The smaller diameter end of the frustro-conical section 10 is welded at 13 to a tubular member or pipe 14 which is preferably formed of the same material as the sections 10 and 11. In other words, in preferred form the body of the coupler A and the tubing 14 are rolled from the same material, thus permitting the respective members to be welded together without danger of burning one of the members while heating the other.

At the other end of the coupler the section 10 is provided at its smaller diameter end with a frustro-conical ring 15. This ring 15 is secured intermediate its ends to the section 10 and in preferred form is connected to the section 10 by the welding 16. The larger diameter end of the ring 15 is outermost to form a bevelled joint for receiving the end of the next adjacent tube 17. It will be understood that in actual practice, the tube 17 is merely one end of the tube 14 connected to another coupler A.

The inner small diameter end 19 of the ring 15 projects inwardly from the extremity of the section 10 to form a V-shaped notch 20 between the ring 15 and the section 10. A ring of wire 21 or other suitable material is welded to the inner surface of the section 10 at a point spaced from the smaller diameter end thereof. Interposed between the ring 21 and extending into the notch 20, we provide a gasket 22 substantially V-shaped in cross section.

The gasket 22 is formed of resilient compressible material such as rubber and is of such a size that the end thereof engaging the ring 21 follows the contour of the ring, due to compression of a part of the end of the gasket by the ring 21. Thus the gasket 22 extends within the notch 20 and between the ring 21 and the section 10, thus being held securely wedged in position.

The gasket 22 comprises a tapered band 23 substantially equal in thickness throughout its length which is attached integrally to an inner web 24 which extends inwardly at an acute angle from one end of the band portion 23. This inner web 24 tapers to a thin fine edge 25 which is designed to engage the surface of the tubular end 17. As illustrated in Figure 4 of the drawing, the insertion of the end 17 into the coupler flexes the web 24 outwardly to tightly encircle this end of the pipe, preventing leakage between this pipe and the wall of the coupling A.

It will be noted that with this construction there is more tendency to tighten the gasket about the pipe than to leak around the gasket. The V-shaped formation of the gasket permits the water within the coupling to act as a wedge to press the gasket both against the body of the coupling and against the pipe contained therein. The notch 20 and the ring 21 prevent the gasket 22 from being urged out of place during the insertion or removal of the tubular member 17.

A cylindrical socket or nipple 26 is welded to the sections 10 and 11 of the coupler A in communication with the interior of the coupler. This nipple 26 is in the form of a cylindrical sleeve or collar welded at 27 to the sections 10 and 11. A suitable sprinkler riser pipe 29 suitable for conveying liquid to a sprinkler mounted upon the pipe may be threaded into the nipple 26 or a cap may be threaded thereinto if no riser pipe 29 is desired at this point.

If desired, the gasket may be formed in the manner illustrated in Figure 7 of the drawing. This gasket 30 is identical to the gasket 22 with the exception that the end of the gasket 31 designed to engage the ring 21 is provided with a series of grooves or serrations 32 to permit the gasket 30 to more easily conform with the contour of the ring 21 and to prevent outward slipping of the gasket 30 with respect to the ring 21. As in the gasket 22, an offset 33 is provided in the web 24 to engage the inner extremity 19 of the ring 15 and to limit movement of the gasket 22 or 30 into the notch 20. This offset 33 also permits the gasket to be thicker adjacent the point of connection between the web 24 and the band portion 23 and forms more nearly a straight line connection with respect to the ring 12.

Upon the end 17 of each tubular member to be secured into the coupler A, we provide a wedge-shaped latch 34 which is welded or otherwise affixed to the outer surface of the tubular end 17 extending radially from the center on a plane through the longitudinal axis of the pipe 17. This wedge-shaped latch 34 terminates in a shoulder 35 over which may engage a loop-shaped link 36, an end of which is pivoted in alignment to the coupler A by the bearing 37. The loop 36 is pivoted by the bearing 37 on a line transverse with respect to the longitudinal axis of the coupler and may pivot into and out of engagement with the latch 34. The loop 36 is so designed as to engage the upper surface of the tubular member 17 as this tubular member is inserted into the coupler, the loop being pivoted upwardly by the wedge-shaped latch 34 during insertion of the end 17 until it passes over the end of the latch 34, whereupon it drops behind the shoulder 35. An end projection 38 limits the upward pivoting of the loop 36, so that the loop always falls down into operable position, projecting beyond the end of the coupler A. The loop 36 is provided with a shoulder engaging end 39 which is curved and which has its center of curvature directly above the inner extremity 19 of the ring 15. Thus as the pipe 17 assumes an angle with respect to the longitudinal axis of the coupler 10, the end 39 of the loop 36 always engages behind the shoulder 35 of the latch 34.

A transversely extending rounded cam 40 is secured to the surface of the tubular member 17 adjacent the end of the latch 34. This rounded cam normally does not engage the loop 36 when the pipe or tubular member 17 is vertical with respect to the coupler A. When it is desired to remove the tubular member 17 from the coupler A, this can be done by twisting the pipe 17 in either direction, thus urging the rounded cam 40 against the loop 36, and raising this loop out of engagement with the shoulder 35, whereupon the pipe 17 may be withdrawn from the coupler.

It will be understood that this type of coupler is particularly useful on irrigation systems and the entire irrigating line must be easily portable from one point to another in order to irrigate or sprinkle a large area. After one area is sprinkled along a field, the entire pipeline is removed to a parallel position to water the next adjacent area. We have found that by constructing the latching mechanism so that the parts of the system may be readily detached from each other, the pipeline may be easily and quickly moved with a great saving in time and energy. If, for example, each section of the system is twenty feet in length, it is possible for the operator to lift the last section at approximately the center after twisting the pipe and pulling it out of engagement with the next adjacent coupler A. The section is moved to the next adjacent position and inserted into the pipeline by merely urging the end 17 into the coupler A, the link 36 automatically hooking the two parts together. In a pipeline a quarter of a mile long, a quarter of a mile of walking may be saved by providing this attachment and detachment feature. The shape of the coupling makes the same extremely strong and capable of withstanding great compressive strength. It is possible for the coupling to withstand the weight of a truck or motor vehicle passing over the same even though the coupler is formed of light sheet material. The pipeline may be formed at a considerable curve due to the possible angularity between the pipe 17 and the coupler without causing danger of leakage. If it is desired, the body of the coupler A may be pressed rather than formed in two separate sections as shown, the pressed sections being connected along longitudinal lines rather than about the periphery as shown.

The frustro-conical shape of the section 11 makes it possible for us to construct enlarging or reducing couplers at virtually no additional cost. The size of the pipe which the coupling will accommodate depends upon the length of the section 11. In Figure 2 we disclose a reducing coupling A' which is identical to the coupling A except for the length of the section 11. The coupling A' includes frustro-conical sections 10' and 11' connected at 12'. A ring 15' is connected to section 10'; and a bearing 37' is provided for the loop 36. All of these elements with the exception of the section 11', which is longer than the section 11, and the pipe 14' which is of smaller diameter than the pipe 14, are similar to corresponding parts of the coupler A. The direction of water flow through all of the couplers is toward the welded end, the outlet being in the section 11 and the inlet in section 10.

In accordance with the patent statutes, we have described the principles of construction and operation of our coupler; and while we have endeavored to set forth the best embodiments thereof, we desire to have it understood that these are only illustrative of a means of carrying out our invention and that obvious changes may be made within the scope of the following claims without departing from the spirit of our invention.

We claim:

1. A coupling including a housing having an inlet end and an outlet end, said coupling comprising a pair of frustro-conical rings secured together at the large diameter end, a pipe secured to one of said inlet and outlet ends, a substantially frustro-conical ring secured to the other of said ends, the smaller diameter end of said ring projecting inwardly from said other end, and a gasket interposed between said ring and said housing and projecting inwardly therefrom.

2. A coupling including a housing, a circular end thereupon, a substantially frustro-conical ring having a large diameter end and a small diameter end secured to said circular end, said housing engaging said ring and being secured integrally thereto intermediate the ends of said ring, and a ring gasket substantially V-shaped in cross-section, one side thereof overlying a portion of the inner surface of said housing, and the other side overlying the smaller diameter end of said ring and projecting beyond the small diameter end of said ring.

3. A coupling including a housing having a substantially circular end, a frustro-conical ring having a large diameter end and a small diameter end secured integrally to said circular end, said circular end being attached to said ring between the large and small diameter ends of said ring, the smaller diameter end of said ring projecting inwardly, a ring gasket substantially V-shaped in cross section and having two sides connected integrally in V formation, one of said sides overlying a portion of the inner surface of said housing, and the other of said sides overlying said ring and extending beyond the end of said ring.

4. A coupling comprising a hollow housing having opposed openings therein, a ring-shaped member projecting inwardly from one of said openings, a ring secured along its line of contact to the interior of said housing spaced from said one opening, and a resilient gasket interposed between said ring and said ring-shaped member, said gasket following the contour of said ring, thus extending wider adjacent the inner surface of said housing than at a point spaced therefrom.

5. A coupling for pipes comprising a hollow housing having an opening therein, a resilient gasket in said opening, a pipe pivotally engaged in said opening, a lug on said pipe, and a link on said coupling substantially wider than said lug engaging said lug, said link including a curved end portion thereupon engageable with the lug, the center of curvature of said end portion corresponding with the pivot point of said pipe in said coupling.

6. A coupling and pipe connection comprising a housing, a link secured thereto, a pipe engageable in said housing, a lug on said pipe engageable with said link, and cam means adjacent said lug to disengage said link from said lug upon relative rotary movement between said pipe and housing.

7. A coupling and pipe connection comprising a housing, a link secured thereto, a pipe engageable in said housing, a lug on said pipe engageable with said link to prevent said pipe from being pulled longitudinally from said housing, and cam means on said pipe engageable with said link to disengage said link from said lug upon relative rotary movement.

8. A coupler comprising a coupler body, a transverse bearing on the top of said body, a loop pivoted in said bearing and projecting beyond an end of said coupler, means on said pipe engageable with said loop to hold said pipe in said body, said loop being formed of a rod having one end extending through said bearing, and bent in a substantially rectangular formation, the other end of the rod extending beyond said one end and being bent to form a stop to maintain said loop projecting beyond said coupling.

ALBERT H. AMES.
THOMAS S. MOULTON.